US005505861A

United States Patent [19]

Hirs

[11] Patent Number: 5,505,861
[45] Date of Patent: Apr. 9, 1996

[54] SYSTEM FOR GRAVITY SETTLING OF FINE PARTICLES FROM A LIQUID

[76] Inventor: Gene Hirs, 37493 Schoolcraft, Livonia, Mich. 48150

[21] Appl. No.: 267,412

[22] Filed: Jun. 28, 1994

Related U.S. Application Data

[63] Continuation-in-part of Ser. No. 121,026, Sep. 10, 1993, abandoned.

[51] Int. Cl.⁶ .................................................. B01D 21/02
[52] U.S. Cl. ........................................... 210/521; 210/513
[58] Field of Search ..................................... 210/800, 802, 210/321.74, 321.83, 416.5, 446, 447, 448, 493.4, 493.5, 513, 521

[56] References Cited

U.S. PATENT DOCUMENTS

| 3,279,616 | 10/1966 | Bourdale | 210/493.5 |
|---|---|---|---|
| 4,039,457 | 8/1977 | Schacht et al. | 210/493.4 |
| 4,650,581 | 3/1987 | Angles et al. | 210/493.4 |
| 4,826,589 | 5/1989 | Hirs | 210/159 |
| 4,826,596 | 5/1989 | Hirs | 210/387 |
| 4,944,877 | 7/1990 | Maples | 210/321.74 |
| 5,112,485 | 5/1992 | Hirs | 210/387 |
| 5,128,037 | 7/1992 | Pearl et al. | 210/321.74 |
| 5,139,670 | 8/1992 | Hirs | 210/394 |
| 5,154,827 | 10/1992 | Ashelin et al. | 210/493.5 |

Primary Examiner—Robert A. Dawson
Assistant Examiner—W. L. Walker
Attorney, Agent, or Firm—Lyman R. Lyon

[57] ABSTRACT

A gravity cartridge filter for filtering fine particles from a fluid comprises a cartridge for disposition in a contaminated fluid tank. The cartridge comprises a plurality of layers that include a fluid passage in vertical juxtaposition with a filter medium, such as a mat, in each layer whereby gravity effects settling of particles suspended in the fluid onto the medium within each respective layer.

1 Claim, 2 Drawing Sheets

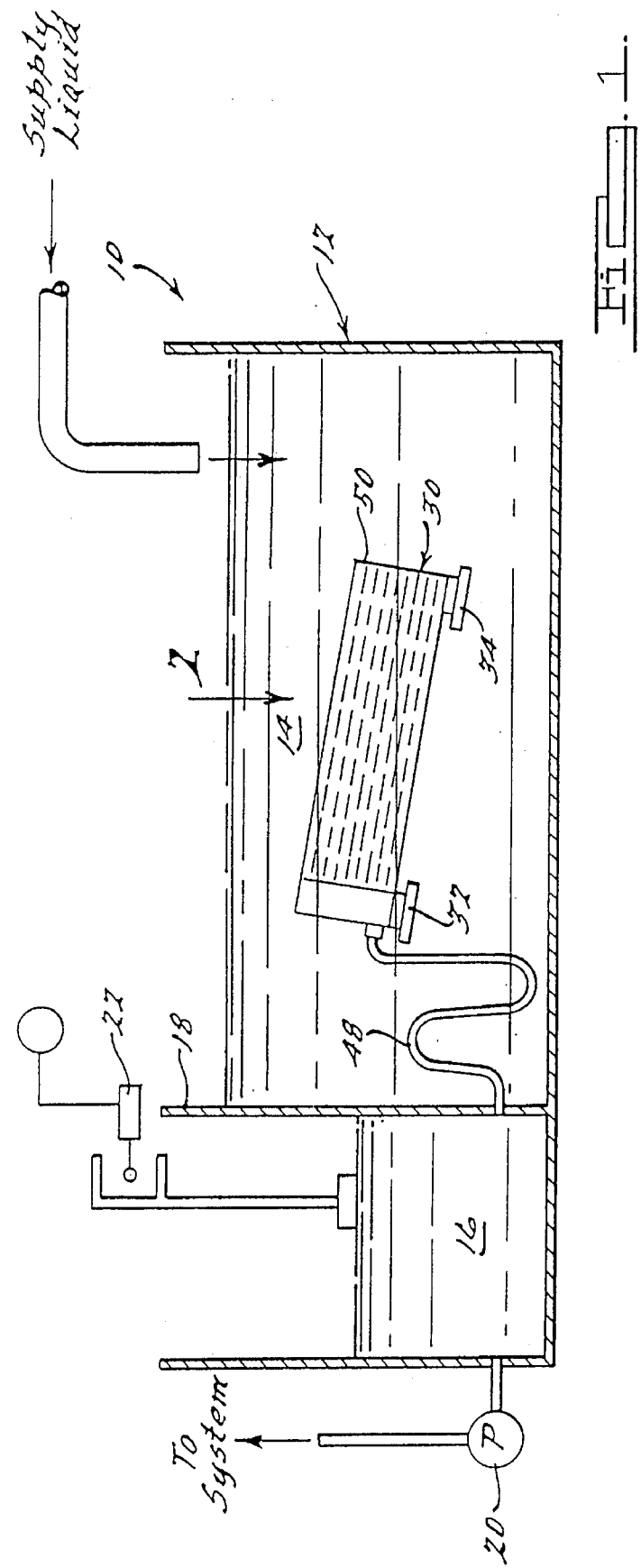

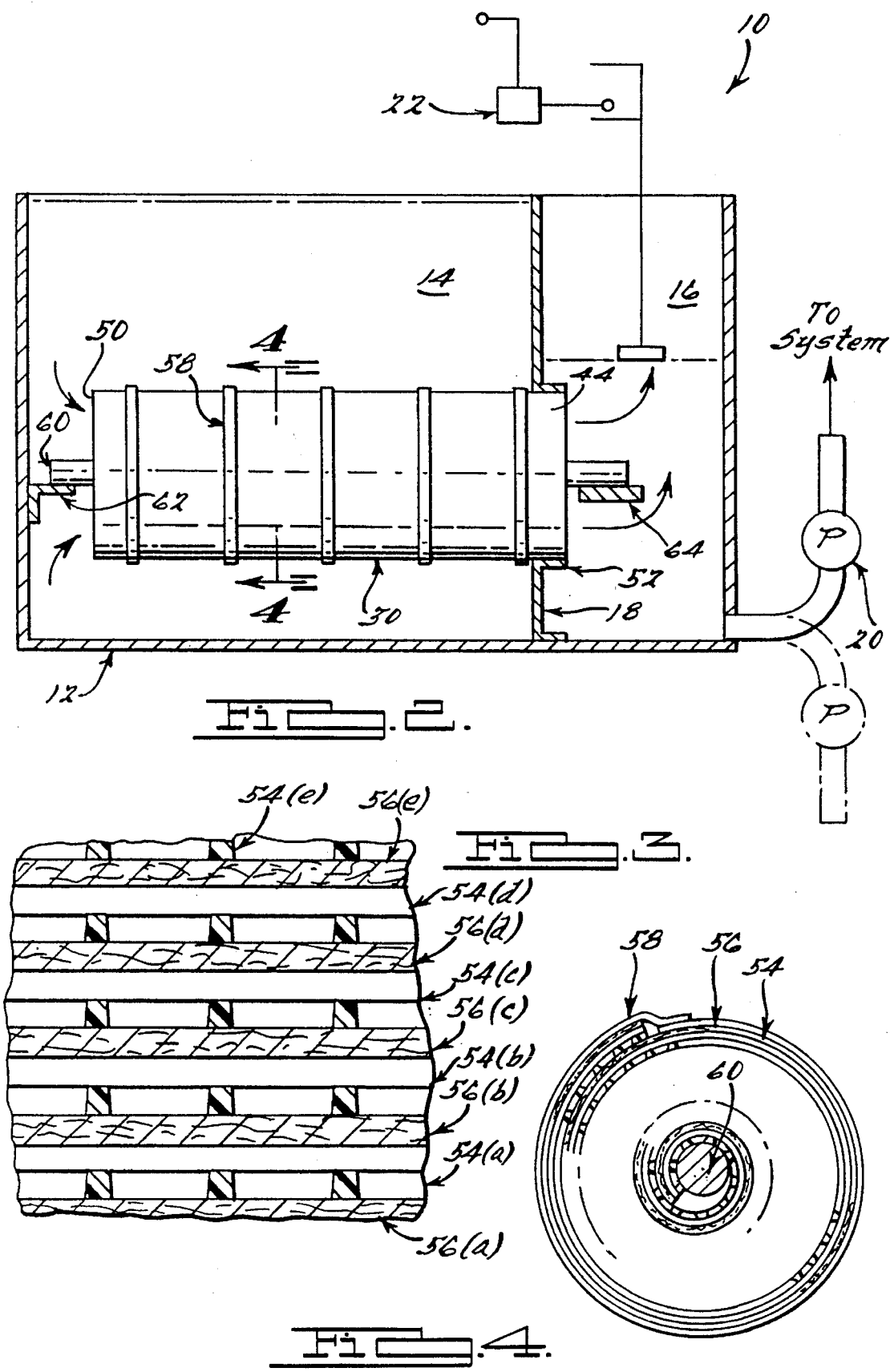

SYSTEM FOR GRAVITY SETTLING OF FINE PARTICLES FROM A LIQUID

CROSS-REFERENCE TO RELATED APPLICATIONS

This application is a continuation-in-part of U.S. patent application Ser. No. 08/121,026, filed Sep. 10, 1993, for an invention entitled, "Gravity Cartridge Filter System,", now abandoned.

BACKGROUND OF THE INVENTION

The present invention relates generally to a system for settling fine particles from a contaminated fluid, and more particularly to a filter system that utilizes a cartridge that, due to construction and orientation, effects separation of relatively fine particles from a liquid by gravity settlement of the particles.

Fine particles produced in certain industrial operations are difficult to remove from a host fluid, such as a coolant utilized in cooling systems to prevent damage to machining equipment due to excessive temperatures. Typically, a water soluble oil coolant is commonly used in known cooling systems. Soluble oil is an emulsion wherein water is the continuous phase and oil is the disperse phase. The soluble oil emulsion comprises globules composed of emulsifying agents and oil, wherein the globules are approximately 0.1 to 0.3 microns in size. The emulsifying agents, or emulsifiers, hold the oil in a stable suspension in the water by preventing the oil globules from increasing in size.

Soluble oil coolants are corrupted over time by solid particulates that are suspended in the coolant. For example, during machining of aluminum, a very thin oxide typically develops on the surface of the aluminum under ambient conditions. When aluminum parts are machined, rolled, or punched, the aluminum oxide, or alumina, tends to peel off the surface and become entrained in the machining coolant. Aluminum oxide particles are extremely abrasive and create a grit filled coolant that is destructive to the machining equipment. In addition to creating a grit filled coolant, the aluminum oxide particles also interfere with emulsifying soaps present in soluble oils. These soaps are usually in the form of sodium salts of fatty acids. When aluminum oxide particles become entrained in the soluble oil, an undesirable ion exchange is established wherein aluminum from the aluminum oxide displaces the sodium in the soluble soap, thereby rendering the soap insoluble. Insoluble soaps are problematic because they plug, or "foul," the filtration media.

The presence of fine particles in a host fluid is not limited to large systems. For example, in conventional engine oil lubrication systems, abrasive particles contaminate the petroleum-derived mineral oil and similarly create wear and tear on the engine.

Conventional cartridge or media type filters are generally utilized to remove suspended solids from a host fluid. However, permanent media filters often require backwashing in order to remove entrapped particles that plug the filter. In the area of cooling systems for industrial machining processes or systems, such backwashing disposes particles, such as alumina, immediately back into the cooling system. Large particles, e.g., greater than 30–250 microns in size, then settle in the cooling system and may be removed by conveyors. However, smaller particles do not settle and are simply not removed, thus further accumulating in the cooling system. The smaller particles are eventually milled into even smaller, often colloidal, particles. As the concentration of these impurities increases over time, the coolant must be replaced by a fresh emulsion, thereby reducing production time by shutting down the machining process. In addition, disposal of spent coolant creates ecological and environmental concerns.

Conventional cartridge filters have a restricted surface area and thus a limited capacity for holding separated solid matter and/or insoluble soaps. Conventional cartridges must therefore be continually discarded and replaced with a new cartridge. For example, conventional pleated automotive engine oil cartridge filters are frequently plugged and inoperative because of limited dirt holding capacity.

Filtration of colloidal or submicronic particles has heretofore been particularly difficult. For example, colloidal alumina particles suspended in a coolant emulsion used in cooling systems for industrial operations are generally smaller than one micron. However, any attempt to specifically filter out the colloidal alumina particles tends to destroy or break down the stability of the globules, which in turn breaks down the stability of the coolant.

In addition, filtration of fine particles has been found to be further problematic because of the very fine porosity required by fine particle filters. For example, filter aids, in a form of a precoat material such as diatomaceous earth, have heretofore been used to maintain the porosity of a filter cake used in fine particle filters so as to minimize blinding and channeling of the host fluid. However, environmental concerns have placed severe restraints on industrial use of such filter aids because of the hazard they create when they are introduced to the host liquid. In many cases such filter aids are carcinogens.

One solution to this problem is to use paper filters of extremely fine porosity. However, when extremely fine particles are filtered through two-dimensional paper of a porosity fine enough to capture the particles, the flow rate very shortly diminishes and the filter paper tends to blind off, thereby attenuating flow of fluid through the filter. Thus, a great deal of filter paper has to be used which is extremely expensive and difficult to handle. Therefore, a need exists for a filter system that effectively removes extremely fine particles from a contaminated fluid in a manner that minimizes both environmental hazards and the cost and efficiency of filtration.

SUMMARY OF THE INVENTION

A gravity cartridge, in accordance with the present invention, solves the aforesaid problems by utilizing gravity to effect settling of fine particles suspended in a fluid. The concept of the invention is that when a fluid having fine particles suspended therein is disposed in a quiet environment, the particles will settle because of gravitational forces. The gravity cartridge includes multiple embodiments all of which provide the cartridge with a plurality of layers wherein each layer includes a passage for fluid flow and a particle settling mat, for capturing fine particles that settle by gravity.

The velocity vector of the particles moving through each fluid passage is less than the gravitational vector acting on the particles, and thus the particles eventually settle to the surface of the mat in each layer. The layers create a relatively large surface area, which is compacted in a relatively small volume. Each mat may be corrugated or undulating, therefore facilitating initial trapping of fine particles that lodge in crevices. As the particle layer builds up, the fine particles exhibit an attraction for each other and tend to coalesce and accrete.

BRIEF DESCRIPTION OF THE DRAWINGS

FIG. 1 is an elevational view, partially in cross section, of a gravity particle settlement cartridge and system in accordance with the present invention;

FIG. 2 is an elevational view, partially in cross section, of another embodiment of a gravity particle settlement cartridge and system in accordance with the present invention;

FIG. 3 is a cross-sectional view that generally illustrates typical layers of the present invention; and FIG. 4 is a cross-sectional view taken substantially along the line 4—4 of FIG. 2.

DETAILED DESCRIPTION OF THE PREFERRED EMBODIMENT(S)

Referring to FIGS. 1 and 2, a system for removing fine particles from a liquid 10 is shown, in accordance with the present invention, as including a tank 12 having a contaminated fluid section 14 and a clean fluid section 16. A barrier 18 divides the contaminated fluid section 14 from the clean fluid section 16. A pump 20 draws fluid from the clean tank 16. A float switch 22 is energized by a predetermined reduction in a differential between the level of contaminated fluid in the tank 14 relative to the level of clean fluid in the tank 16 to activate an external control and/or warning mechanism which provides an indication that the gravity particle settlement cartridge 30 is plugged with sediment.

In a first arrangement, as shown in FIG. 1, the gravity cartridge 30 is mounted on supports 32 and 34 internally of the contaminated fluid section 14. A plenum 44 is disposed at one end of the cartridge 30 and has an outlet fitting 46 thereon for connection to a line 48 extending through the partition 18 so as to communicate with the clean tank 16. An opposite end 50 of the cartridge 30 is open for the admission of contaminated liquid into the cartridge 30.

An alternative arrangement for the system 10 is shown in FIG. 2. The barrier 18 is adapted to provide an opening for placement of the gravity particle settlement cartridge 30 between the contaminated fluid section 14 and the clean fluid section 16. A seal 52 is provided on either side between the barrier 18 and the cartridge 30 to further prevent communication between contaminated fluid and clean fluid. After fluid flows through the cartridge 30, the fluid is discharged directly from the plenum 44 into the clean fluid section 16 of the tank 12.

In accordance with the present invention, the gravity particle settlement cartridge 30 utilizes a plurality of layers having a passage for flow of fluid in vertical juxtaposition with a medium, such as a plate or a mat, for capturing fine particles. For example, one embodiment of the cartridge 30 includes a plurality of spaced impervious plates. The plates are disposed in close proximity to one another, e.g., approximately 0.125 inch (≈3 mm) apart, and flow is directed from one end of the plates to the opposite end. In addition, the surface of each plate is preferably provided with an abrasive or rough surface finish to initially trap fine particles as the particles settle from a liquid flowing through the filter cartridge 30.

FIG. 3 of the drawings illustrates a second embodiment for the gravity particle settlement cartridge 30, in accordance with the present invention. The arrangement also includes fluid passages and media in alternating vertical juxtaposition, wherein the medium in each layer captures fine particles that settle by gravity from fluid flowing through a corresponding fluid passage. As shown in FIG. 3, each layer may include a drainage net 54(a)–(e) and a settling mat 56(a)–(e). Each net 54 serves as a fluid passage, and each mat 56 captures fine particles that settle by gravity from fluid that flows in a corresponding net 54. More specifically, a first mat 56(a) is bonded to a corresponding first net 54(a), which in turn, is bonded to another vertically adjacent second mat 56(b). This multiple repeated arrangement forms a plurality of layers. Each layer includes one net 54, and one mat 56.

Both the drainage nets 54 and settling mats 56 are preferably formed from polymeric materials such as polyethylene and polypropylene, which are suitable because they are not soluble in water, they will not readily decompose, and they are readily available and inexpensive materials. However, many alternative materials may be utilized in the present invention including but not limited to, nylon, cellulose, or even wood. As shown in FIG. 3, each net 54, preferably formed from polyethylene, comprises intersecting strands which form a permeable, generally crisscross pattern, thereby creating spaces which allow for flow of fluid therein. Each mat 56, preferably formed from polyester or polypropylene, is bonded to a net 54 and comprises a woven or nonwoven fabric which prevents fluid flow and thereby captures particles by gravity from a corresponding drainage net 54. Nonwoven fabrics are most preferred because they are porous and exhibit high absorptivity. As best seen in FIG. 3, for large applications such as cooling systems for machining processes, a preferable distance between each mat 56(b)–56(a), i.e., the height of each drainage net 54, is for example 0.20 inch (≈0.51 cm), and a preferable distance between each net 54(b)–54(a), i.e., the height of each settling mat 56, is for example, 0.10 inch (≈0.25 cm).

In accordance with the present invention, a preferred embodiment of the gravity particle settlement cartridge 30 is constructed in a cylindrical, or rolled configuration, thus having an annular cross section, as best seen in FIG. 4. Generally, the cartridge roll 30 is advantageous because the rolled configuration eliminates the need to provide an outer housing for the cartridge. The outer cylindrical surface of the rolled configuration forms the cartridge, thus eliminating the need for any separate outer housing. As shown in FIGS. 2 and 4, straps 58 or bands are simply positioned on the outside of the roll 30 for firm binding support.

The cartridge roll 30, in accordance with the present invention, is preferably a composite formed from a drainage net 54 and settling mat 56 bonded together by heat under pressure and then revolved around an axis (i.e., a shaft or core) and wound thereby forming a plurality of layers in the rolled configuration, as best seen in FIG. 4. The wound cartridge roll 30 is an advantageously inexpensive, easy to make, and efficient arrangement. Furthermore, the wound roll embodiment of the cartridge 30 minimizes the waste of materials during manufacture because the materials do not require cutting to match particular dimensions. However, the rolled embodiment may alternatively be constructed as a plurality of individual layers, such as substantially concentric layers, if desired.

In accordance with the present invention, the preferred system arrangement utilizes the wound rolled cartridge embodiment of FIG. 4 in the system configuration illustrated in FIG. 2. As seen in FIG. 2, the gravity cartridge roll 30 is wrapped on a shaft 60 and positioned internally of the tank 12. Each end of the shaft 60 is mounted on a V support 62 and 64. The V support 62 is positioned within the contaminated fluid section 14, and the V support 64 is positioned within the clean fluid section 16.

For utilization with cooling systems for industrial processes, the cartridge roll 30 is, for example, 300 ft long (91.4 m), with a width of 7.5 ft (2.29 m), and with 900 ft (274 m) wrapped around the shaft 60, thereby creating a diameter of 62 inches (1.57 m). The center pipe core or shaft 60 has, for example, an 8 inch (20 cm) diameter, and must be sufficiently sturdy to support a dead weight of approximately 1250 lbs (567 kg) and a live weight of approximately 6000 lbs (2722 kg), and is eventually positioned onto the respective V supports 62–64 in the tank 12. The gravity cartridge roll may also be adapted for a smaller environment, such as automotive engine oil cleansing, as described hereinbelow.

In operation, the gravity filter cartridge 30 effects gravity particle settling in a practical manner by creating a relatively large surface area which is compacted into a relatively small volume for settling and accretion of particles. The velocity vector of the particles flowing through the drainage nets 54 is less than the gravitational vector acting on the particles, and thus the particles eventually settle to the mat 56 in each layer. In addition, the layers facilitate settling because the distance that the particles travel when acted upon by gravity is relatively short.

The surface of the mats 56 is preferably compatible with the particles being settled so that there is a mutual attraction therebetween. In many instances, the particles in the contaminated fluid will be attracted to the mats 54 under ambient conditions. For example, a soluble oil coolant will saturate the fabric. Settling particles will therefore be attracted to the fabric surfaces under operating conditions. However, it is noted that preliminary treatment of the mats 56 may be required in some applications in order to enhance attraction of settling particles to the mats 56. For example, if particles are settling from a water solution, the mats 56 should be treated with a material which has an affinity for settling particles but is not soluble in water, such as hydrophobic materials including oil, certain asphalt products, or paraffin.

Moreover, settling area is increased because the mats 56 are porous, thereby allowing some particles to actually lodge within the fabric, thereby further increasing capacity for holding settling particles. In addition, accretion of particles is facilitated because the particles display an attraction for each other. Generally, the settling surface is roughened or undulating so that the particles can lodge in crevices and be anchored for the trapping of other particles.

Generally, the rate of fall of the dirt particles onto the settling mats 56 depends upon the type of host liquid flowing through the cartridge. For instance, the types and quantities of emulsifying detergents differ in various soluble oils. Detergents concentrate at oil-water interfaces, exert emulsifying action, and aid in removing dirt particles. In soluble oils having either a low quantity or a low quality of detergents, the rate of fall of the solid particles may be relatively slow. In operation, during settling of solid particles from host liquids wherein the rate of fall of the suspended particles onto the settling mats 56 is relatively low, such as in soluble oils having minimal detergency levels, an interrupted flow pattern is preferably established through the system 10. More specifically, the interrupted flow pattern periodically creates a "quiet" or "dwell" time that facilitates the settling of particles onto the settling mats 56. Alternating cycles of "flow" time and "quiet" time are therefore established. For example, the host liquid may be allowed to flow into the gravity cartridge system 34 for five minutes, followed by a five minute "quiet" interval for settling of particles. The interrupted flow cycles through the filtration system 10 are not necessarily required, however. In host liquids in which the rate of fall of solid particles is suitable, such as in soluble oils having adequate detergents, then the interrupted flow is unnecessary.

In accordance with the present invention, the gravity cartridge 30 may be adapted for use in many applications, such as automotive engines. The benefits of the present invention, such as the aforesaid large surface area which is compacted in a relatively small volume. The exemplary dimensions as noted hereinabove are adjusted for a smaller environment. For instance, the dimensions for a smaller cartridge may provide for a 4 inch ($\approx$10.2 cm) diameter and a 6 inch ($\approx$15.2 cm) length. In addition, the height of each drainage net 54 and each settling mat 56 may be, for example, 10 times smaller than the aforementioned dimensions for larger applications. Thus, the height of each drainage net 54 may be, for example, 0.02 inch ($\approx$0.051 cm), and the height of each settling mat 56 may be, for example, 0.01 inch ($\approx$0.025 cm).

While the preferred embodiment of the invention has been disclosed, it should be appreciated that the invention is susceptible of modification without departing from the scope of the following claims.

I claim:

1. A system for removing fine particles from a liquid comprising:

a tank for the acceptance of a liquid contaminated with fine particles;

a cartridge positionable within said tank below the surface of the contaminated liquid having closed sides, closed top, and closed bottom, an open end for the admission of contaminated liquid, and a horizontally aligned closed plenum at an opposite end for the acceptance of liquid flowing horizontally through said cartridge;

a plurality of vertically spaced generally horizontally extending particle entrapment mats positioned within said cartridge and extending from the open end to the plenum thereof, said particle entrapment mats extending generally parallel to flow of contaminated liquid through said cartridge from the open end to the plenum thereof whereby gravity effects settling of particles suspended in said liquid on an upper surface of said mats; and a conduit for removing liquid from said tank extending between the plenum of said cartridge and an outlet in the exterior of said tank, the outlet in said tank being spaced below the surface of the contaminated liquid therein whereby a flow of liquid through said cartridge is induced by a liquid pressure head between the surface of the liquid and the liquid outlet in said tank.

* * * * *